April 9, 1968     A. B. MUSICHUK     3,377,084
SEAT FOR VELOCIPEDE

Filed May 12, 1966                                          2 Sheets-Sheet 1

INVENTOR.
ALEXANDER B. MUSICHUK
BY
ATTORNEYS

April 9, 1968 A. B. MUSICHUK 3,377,084
SEAT FOR VELOCIPEDE
Filed May 12, 1966 2 Sheets-Sheet 2

INVENTOR.
ALEXANDER B. MUSICHUK
BY
ATTORNEYS.

United States Patent Office 3,377,084
Patented Apr. 9, 1968

3,377,084
SEAT FOR VELOCIPEDE
Alexander B. Musichuk, Parma, Ohio, assignor to
The M.T. & D. Company, a corporation of Ohio
Filed May 12, 1966, Ser. No. 549,703
7 Claims. (Cl. 280—274)

My invention relates to seating structures adapted for velocipedes and the like.

My invention is directed to a novel structure for providing a seat for a velocipede so arranged that the saddle of the seat may be adjustably positioned relative to the steering post and backbone of the frame to meet the requirements of the rider of the velocipede, and which allows for the changing of the position of the rider along the length of the seat structure.

An object of my invention is to provide a strong, safe and comfortable seat for a velocipede which is adaptable to the particular requirements of the rider of the velocipede in respect to size and manner of riding.

Another object is the provision of a seat for a velocipede which has a plurality of alternate dispositions as to extension, size and angularity.

Another object is the provision of a seat for a velocipede, which seat is both of the elongated or "banana" type and of the saddle type having a cantle inclined upwardly at the rear.

Another object is the provision of a unique construction in a velocipede seat permitting flexibility in the arrangement and disposition of the seat.

Other objects and a fuller understanding of the invention may be had by referring to the following description and claims taken in conjunction with the accompanying drawings, in which:

Figure 1:
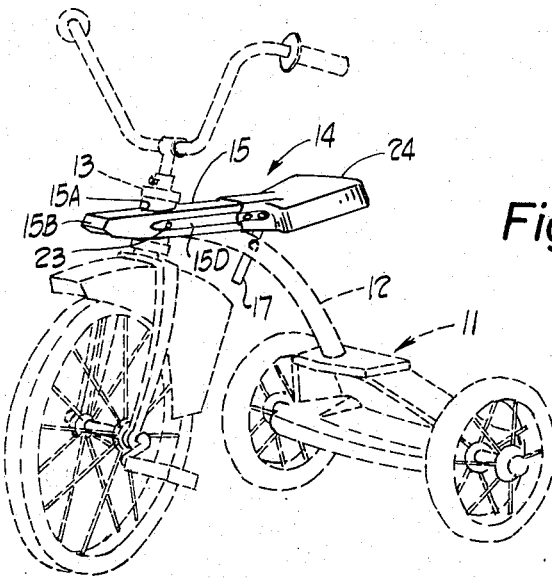
FIGURE 1 is a perspective view of a velocipede incorporating my improved seat, the velocipede other than the seat being shown in broken lines.
Figure 2:
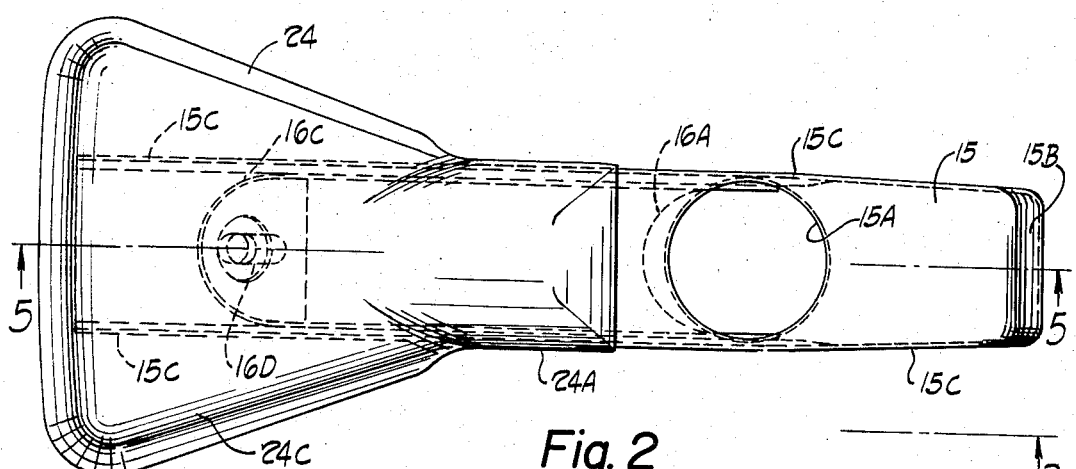
FIGURE 2 is an enlarged plan view of my improved velocipede seat removed from the velocipede.
Figure 3:
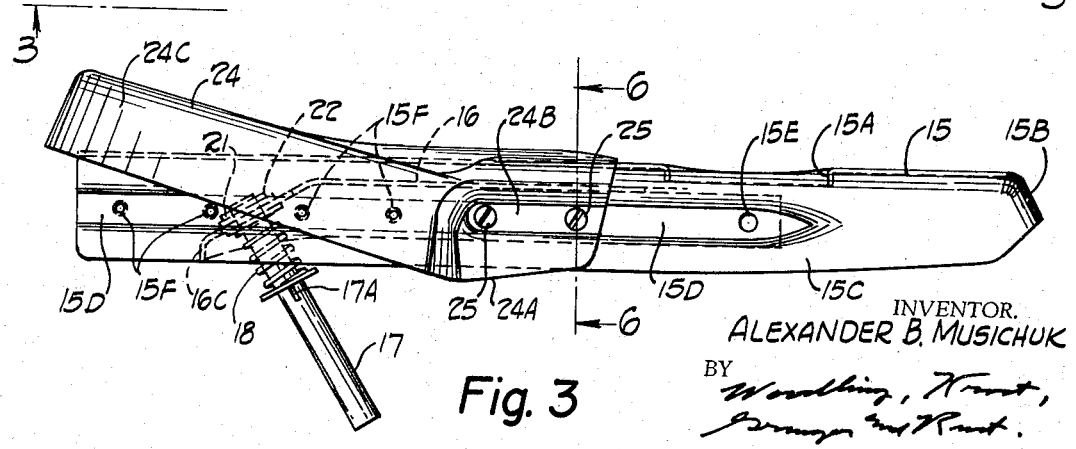
FIGURE 3 is a side view of the seat shown in FIGURE 2 and looking in the direction of the arrows 3—3 of FIGURE 2.
Figure 4:
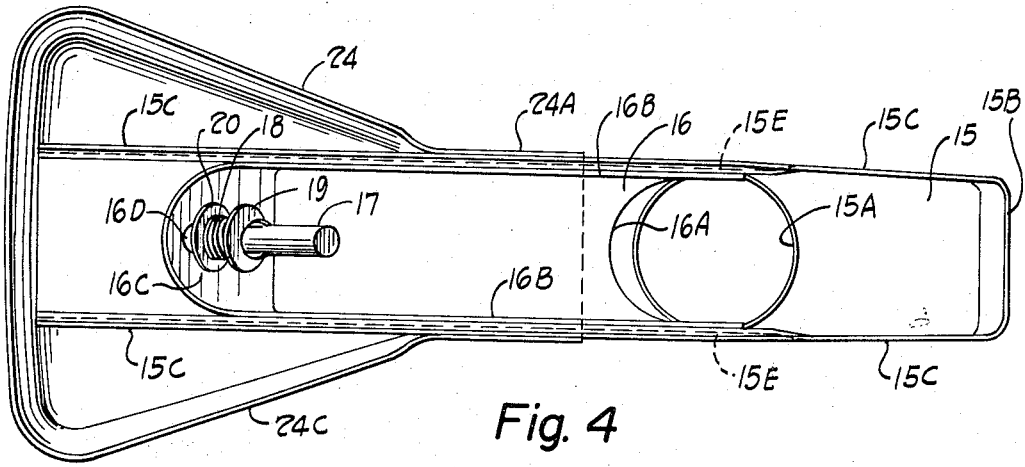
FIGURE 4 is a bottom view of the seat shown in FIGURE 2.
Figure 5:
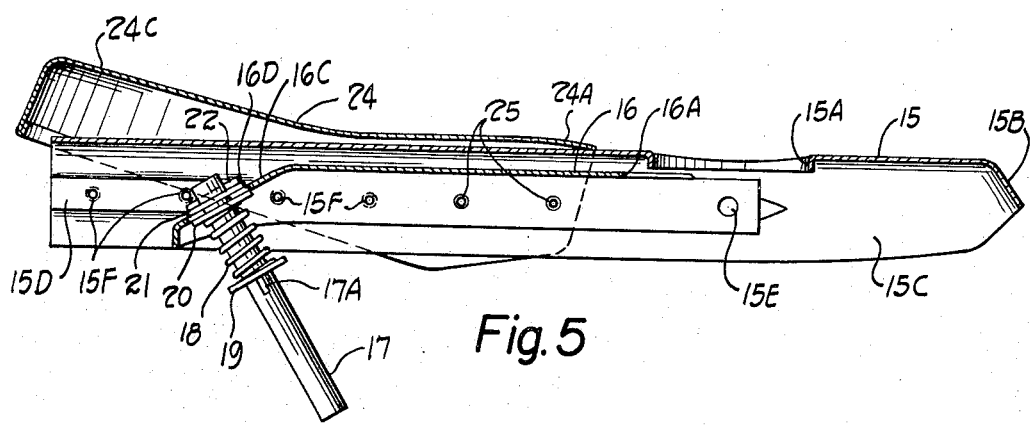
FIGURE 5 is a longitudinal sectional view of my seat taken through the line 5—5 of FIGURE 2.

The velocipede to which my seat may be applied is shown in FIGURE 1 by broken lines and is indicated generally by the reference character 11. This velocipede has the usual cylindrical sleeve 13 accommodating the steering post thereof and a backbone 12 incorporated in the frame of the velocipede. The sleeve 13 has a cylindrical outer surface and extending therethrough is the steering post interconnecting the handles and front wheel fork, the steering post being rotatable on the axis of the cylindrical sleeve 13. The frame 12 has an opening extending transversely therethrough at a location rearwardly of the sleeve 13 in the usual manner and which is adapted for receiving the pintle or post of the velocipede seat.

My improved seat assembly is denoted generally by the reference character 14. The seat assembly 14 includes a longitudinal channel member 15 which has a generally horizontal flat body portion along opposite edges of which extend parallel flanges 15C. There is an oval-shaped opening 15A in the body of the longitudinal member 15 near its forward end thereof. This opening 15A accommodates the cylindrical sleeve 13 therein and is somewhat oval shaped so as to permit the longitudinal member 15 to swing in a vertical plane relative to a reference plane normal to the axis of the sleeve 13.

On opposite sides of the opening 15A there are aligned openings in the flange portions 15C, which aligned openings accommodate screw bolts 23 extending into the wall of the sleeve 13. These screw bolts 23 on opposite sides of the cylindrical sleeve 13 provide a pivot support for the longitudinal member 15 carried by the sleeve 13. The forward end of the longitudinal member 15 is formed downwardly to provide the forward nose portion 15B as illustrated.

Extending along the opposite outside surfaces of the flange portions 15C are elongated dwells or grooves 15D which extend from the rearwardmost end of the longitudinal member 15 to approximately the location of the oval opening 15A. Extending through the flange portions 15C at the bottom of the grooves 15D are a plurality of equidistantly spaced holes 15E. In the structure illustrated, there are six pairs of aligned holes 15F in the longitudinal member 15.

Mounted within and welded to the longitudinal member 15 is a channel-shaped supporting member 16 which is considerably shorter than the longitudinal member 15. The forward end of the supporting member 16 has a cutaway front end 16A of arcuate shape so as to clear the oval opening 15A. The supporting member 16 has spaced parallel longitudinal flange portions 16B which extend along and in contact with the inner wall of flange portions 15C of longitudinal member 15. At the rearward end of the supporting member 16 there is provided an angular tail portion 16C which is bent downwardly as it extends rearwardly at the approximate angle illustrated. Formed in this tail portion 16C is an elongated slot 16D having its longitudinal axis disposed approximately in the vertical plane of the velocipede frame and hence longitudinally of the longitudinal member 15.

A pintle or seat post 17 has its upper end disposed in the elongated slot 15D, the pintle 17 having a cylindrical outer surface having a diameter slightly less than the narrowest width of the elongated slot 16D so that the pintle may move lengthwise of the elongated slot 16D. The lower end of the pintle 17 is adapted to be secured by a suitable bolt or the like in the usual opening provided in the backbone 12 of the velocipede frame. The extension of the pintle 17 relative to the backbone may be adjusted by means of the bolt which secures the pintle to the backbone. The pintle 17 has an integral wing portion 17A formed by upsetting of the metal of the pintle at that location. Disposed concentrically on the pintle 17 above the wing portion 17A is a washer 19. Disposed concentrically on the pintle 17 above the washer 19 is a coil spring 18. Disposed above the coil spring 18 and below the tail portion 16C is another washer 20 having a size to prevent it from going through the elongated slot 16D. Also disposed around the pintle 17 and above the tail portion 16C is another washer 21 having a size to prevent it from going through the elongated slot 16D. A cotter pin 22 extending through an opening provided in the upper end of the pintle 17 holds the washer 21 in position. The spring 18 has a bias which urges the tail portion 16C upwardly relative to the backbone carrying the pintle 17. The coil spring 18 provides some resiliency for the weight of the rider on the seat and also permits some limited tilting of the pintle 17 relative to the tail portion 16C and hence relative to the longitudinal member 15.

My seat also includes a saddle member 24 which has a forward channel portion 24A and cantle portion 24C extending upwardly at an incline from the plane of the channel portion 24A. As seen in the drawings, the cantle portion 24C gradually extends laterally to be wider at the rear than the forward end of the saddle portion and also is inclined upwardly from the plane of the top surface of the longitudinal member 15. It is also to be noted that the rearwardmost edge of the cantle portion 24C is disposed above the top surface of the longitudinal member 15 in any of the alternative positions of the saddle member along the length of the longitudinal member 15.

Figure 6:
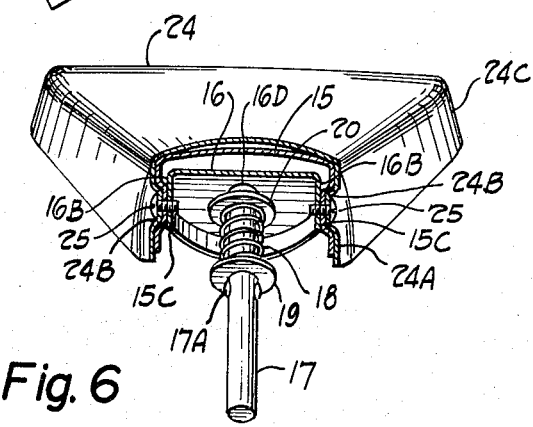
FIGURE 6 is a cross-sectional view of my seat taken through the line 6—6 of FIGURE 3.

Formed in the opposite sides of the channel portion 24A of the saddle member 24 are elongated projections or bosses 24B which snugly fit into the elongated grooves 15D of the longitudinal member 15. The fit of the bosses 24B in the grooves 15D is such that the saddle member 24 may slide longitudinally of the longitudinal member 15 but may not be tilted angularly thereto nor moved laterally thereto. The close sliding interfit of the bosses 24B in the grooves 15D is illustrated in FIGURE 6.

Four screw bolts 25 are provided which extend into two holes provided in each of the opposite sides of the channel portion 24A of the saddle member 24 upon such holes being registered with two selected holes 15F in the flanges 15C of longitudinal member 15. The screw bolts 25 thus prevent the longitudinal movement of the saddle member relative to the longitudinal member 15 after the saddle member has been adjustably moved to the desired location along the length of the longitudinal member 15. To change the relative location of the saddle member 24 with respect to the longitudinal member 15, the screw bolts 25 on each side of the seat are removed and the saddle member 24 slidably moved along to the desired location and where the holes in the saddle member register with selected holes in the longitudinal member 15. Thereupon the screw bolts 25 are inserted and secured in place.

To permit a tilting of the entire seat assembly relative to the axis of the cylindrical sleeve 13, the pintle 17 may be moved upwardly and downwardly relative to the backbone 12 and there secured in position. The oval shape of the opening 15A accommodates for this swinging of the seat assembly relative to the axis of the cylindrical sleeve 13. The arcuate movement of the rearward portion of the seat assembly is also accommodated for by the pintle 17 being permitted to move lengthwise of the elongated slot 16D. The spring 18 is permitting some limited tilting of the pintel 17 relative to the plane of the tail portion 16C also accommodates for this angular swinging of the seat assembly relative to a horizontal plane notwithstanding the fixed axis of the hole in the backbone 12 in which the pintle 17 is fixed.

By the combination of structural features and part illustrated, considerable flexibility in the adjustment and positioning of the seat relative to the velocipede frame is permitted as desired.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A seat for a velocipede having a frame, the frame including a steering post cylindrical sleeve and a backbone extending rearwardly and downwardly from said sleeve, said sleeve having a cylindrical outer wall and said backbone having an opening extending therethrough in an upright plane extending through said sleeve, said seat comprising in combination a longitudinal member having a generally horizontal flat body portion adapted to be disposed longitudinally of said frame, said body portion having an oval opening extending therethrough adjacent the forward end thereof for accommodating said cylindrical sleeve through the opening, said longitudinal member having spaced flange portions extending downwardly along the longitudinal edges of said body portion, said flange portions each having an elongated dwell extending along the outer side thereof, said dwells being disposed parallel to each other, said longitudinal member having a supporting portion extending at an angle downwardly and rearwardly from said body portion, said supporting portion having an elongated slot extending therethrough longitudinally of said frame, a pintle disposed in said slot and extending downwardly from said supporting portion and into the opening in said backbone for securement to said backbone, said pintle carrying axially spaced abutting portions for retaining the pintle in said slot, a saddle member having a rearward seat portion and a forward channel portion extending forwardly therefrom, said channel portion having a body portion and spaced flange portions extending along the opposite longitudinal edges thereof to complementarily fit over the outer side of said longitudinal member and to be slidably moved along said longitudinal member, the said flange portions of said channel portion having boss portions disposed in said elongated dwell portions of the said elongated member to resist movement of the saddle member relative to the said longitudinal member other than longitudinally of the said longitudinal member, said flange portions of the longitudinal member having adjacent openings adjacent the forward end thereof for accommodating first screw means extending through said aligned openings and into said cylindrical sleeve for supporting the forward portion of the seat on said sleeve, said dwell portions of the longitudinal member having a first plurality of holes therethrough and said boss portions of the saddle member having a second plurality of holes therethrough, less than said first plurality, selectively registrable with certain only of the holes in said dwell portions to accommodate second screw means to secure the saddle member at a selected position of a plurality of positions along the length of the longitudinal member as determined by the number and relationship of said first plurality of holes in the boss portions of the longitudinal member.

2. A seat for a velocipede as claimed in claim 1, and including a coil spring carried by said pintle and interposed between a fixed portion on said pintle and one of said abutting portions for resiliently supporting the said supporting portion on said one abutting portion.

3. A seat for a velocipede as claimed in claim 1 and in which the rearward seat portion of said saddle member is inclined upwardly and rearwardly from said channel portion thereof and disposed above the plane of the flat body portion of said longitudinal member to clear the same in forward positions of the saddle member along said longitudinal member.

4. A seat for a velocipede having a frame, the frame having a steering post cylindrical sleeve and a backbone extending rearwardly from the steering post, comprising in combination a longitudinal member having an opening therethrough adjacent its forward end for accommodating said steering post cylindrical sleeve, a pintle carried by the longitudinal member and extending downwardly therefrom for securement to said backbone, a saddle member carried by the longitudinal member and movable lengthwise of the longitudinal member to a plurality of alternative positions therealong, interlocking means carried by said longitudinal member and said saddle member for permitting said lengthwise movement of the saddle member but preventing angular and lateral movement of the saddle member relative to the longitudinal member, securing means securing said saddle member and said longitudinal member together at selected of said alternative positions, said saddle member having a rearward seat portion extending upwardly at an angle to the plane of the upper surface of said longitudinal member to clear said longitudinal member in its forward of said alternate positions.

5. A seat for a velocipede as claimed in claim 4 and including pivot means for connecting said longitudinal member to said steering post cylindrical sleeve adjacent said opening to permit the longitudinal member to pivotally swing in a vertical plane coinciding with said frame, said opening being substantially oval to accommodate for swinging of the longitudinal member to positions at an angle to the axis of the steering post cylindrical sleeve, and in which said longitudinal member includes an angular supporting portion for carrying said pintle at an angle to the longitudinal axis of the longitudinal member, said angular portion having an elongated slot therein for accommodating said pintle to permit the said pivotal swinging of said longitudinal member in said vertical plane and relative to the axis of the pintle.

6. A seat for a velocipede as claimed in claim 5 and including resilient means operatively interconnecting said pintle and angular supporting portion and arranged to permit limited angular movement of said angular supporting portion relative to the axis of said pintle.

7. A seat for a velocipede as claimed in claim 4, and in which said interlocking means includes elongated parallel grooves extending along opposite sides of the longitudinal member and projections extending inwardly of said saddle member on opposite sides thereof into said grooves and slidable therealong to selected of a plurality of alternate positions along the groove, and in which said securing means include a plurality of holes in said longitudinal member and holes in the saddle member registrable with selected of the holes in the longitudinal member and threaded members insertable in the registered holes of said holes of the longitudinal member and saddle member.

References Cited

UNITED STATES PATENTS

| | | | |
|---|---|---|---|
| 2,068,125 | 1/1937 | Kraeft | 280—282 X |
| 2,107,561 | 2/1938 | Brandt et al. | 297—209 |
| 2,476,226 | 7/1949 | Schwinn | 297—195 |
| 3,264,011 | 8/1966 | Ryan | 280—287 |

KENNETH H. BETTS, *Primary Examiner.*